United States Patent Office 3,204,655
Patented Sept. 7, 1965

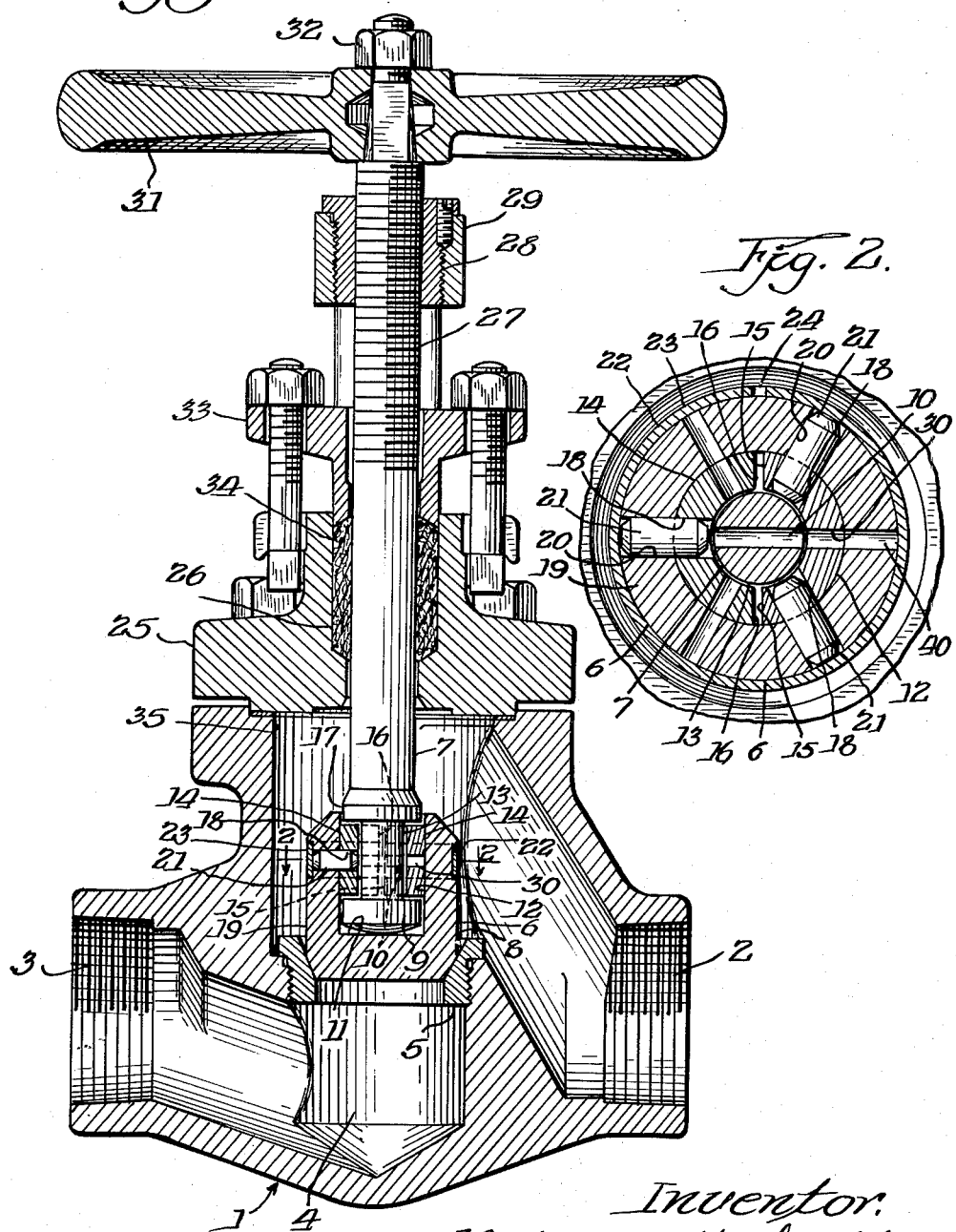

3,204,655
DISC-STEM CONNECTION FOR VALVES
Kurt B. Bredtschneider, Chicago, Ill., assignor to Crane Co., Chicago, Ill., a corporation of Illinois
Filed Feb. 20, 1963, Ser. No. 259,815
4 Claims. (Cl. 137—315)

This invention relates generally to a valve construction, and, more particularly, it is concerned with a novel disc-stem connection for valves and the like.

Heretofore, one of the problems confronting valve designers and manufacturers has been to meet the requirement of many organizations, such as the United States Navy, for example, that the usual stem-disc connecting means employed, such as screw threads, be eliminated. This structural rejection is based upon the fact that in many installations of unusually severe service, the disc stem ring thereaded connection between the stem and the valve closure member is not considered to be sufficiently sturdy and durable for the severe services encountered. In addition, of course, there is the fact that vibration in a pipe line may seriously interfere with the security of the joint effected by the threads and there have been many instances where actual separation has taken place between the stem and closure member because of the failure of the threads to function properly, thus making the valve in such cases inoperative.

Therefore, it is one of the more important objects to provide for a valve construction specifically directed to a disc-stem connection in which such objections are overcome and in addition provides for the connection being conveniently and economically made in the field if and when inspection indicates that such adjustment or replacement is necessary.

In other cases in the past in those installations in which the valves are installed in the piping with the line fluid pressure above the valve closure member, the valve opening force is transmitted from the valve stem to the closure member by pins or balls which are in line or point contact with the stem and closure member or one of them in a ring groove. The valve opening force is transmitted in this way from the valve stem to the closure member with an unusually high specific load. This condition causes the connections to wear out prematurely and eventually results in a poor connection and a need for prompt replacement. Also in such cases, the removal of the connecting means such as balls or pins is relatively difficult and poses a severe problem in the field where special tools or equipment are not ordinarily available.

Therefore, one of the more important objects of this invention is to avoid these difficulties, and, as will hereinafter become apparent, such object is attained with a novel sturdy construction capable of quick assembly and disassembly when necessary.

Other objects and advantages will become more readily apparent upon proceeding with the specification, read in light of the accompanying drawings, in which:

FIG. 1 is a sectional assembly view of a valve embodying my invention; and

FIG. 2 is a magnified transverse sectional view taken on the line 2—2 of FIG. 1.

Referring now to FIG. 1, a conventional valve casing generally designated 1 is shown, having the usual inlet at 2 and outlet at 3, respectively, for attachment to a pipe line (not shown). The said threaded connections are purely illustrative and not a matter of limitation, since other types of connections may be employed. Between the inlet and outlet connections 2 and 3, the valve body is provided with the usual central chamber 4. A threaded seat ring 5 is mounted in the upper portion of chamber 4 for receiving a reciprocally movable valve closure member 6 connected to a valve stem 7 for providing the said reciprocating movement of the valve closure member to and from the valve seating surface 8.

It is in the connection between the valve stem 7 and the closure member 6 with which this invention is specially concerned.

As shown in FIG. 1, the inner end limit of the stem 7 is provided with an annular shoulder forming a button-head 9, preferably contacting the surface 11 of the closure member 6 when the valve is being closed. To provide the connection between the stem 7 and closure member 6, the latter member is provided with a central cylindrical recess defined by the wall 12 to receive the said button-head 9. Outwardly of and above the latter button-head, the stem is provided with a narrow neck portion 13. Before the insertion of the button-head 9 within the chamber 12, a plurality of segmental members 14 are circumferentially placed around the stem neck 13. The number of such segments is immaterial, depending upon the size of the valve, preferably so made that when mounted they substantially fill the annular chamber between the outside diameter of the stem neck 13 and the inside wall surface 12, as more clearly shown in FIG. 2.

It will be noted, as shown more clearly in FIG. 1, that the thickness of the segments 14 is substantially equal to the length of the stem neck portion 13, the length of the said latter portion being defined at its outer end by the integral stem collar 17. The said collar serves the backseating function for the stem in the valve open position.

Transversely extending through the said segmental members 14 and preferably evenly spaced around the circumference provided by the assembled segments, a plurality of apertures 18 preferably extend radially through said segments. A plurality of radially extending apertures extend through the wall 19 of the closure member 6 to coincide with the transverse apertures 18 of the segments 14. Fitted relatively closely within the respective apertures in the closure member and in the segments as indicated at 18 and 20, pins 21 are mounted, preferably of a length as indicated more clearly in FIG. 2. Thus, the said pins substantially fill the transverse apertures 18 and 20. At an inner end portion thereof, each of said pins slidably contacts the neck portion 13 of the stem 7 as illustrated, and whereby the segments 14 are locked against relative rotation by their engagement with the pins 21. The latter pins at their outer end portions engage the transverse apertures 20 of the closure member. The over-all assembly is thus held in place on the button-head of the stem by means of the plurality of pins 21. In order to hold the pins 21 in place, the closure member 6 is preferably provided with the groove 22 for receiving the split spring ring 23, the latter being split at a portion of its circumference as indicated at 24. Removal of the said split spring is obviously accomplished by simply inserting a screw driver tip at the ring split portion to expand the latter member and disengage it from the closure member groove 22.

In connection with the functioning of the said split ring, it should be noted that as an alternative construction, the inner annular surface 35 of the casing 1 may be of a diameter to coincide substantially with the diameter 19 of the closure member 6. In such case, the need for the retaining split spring ring is eliminated, since the casing surface 35 function to retain the pins 21 in desired position.

In connection with the foregoing description, it will be noted that the stem 7, the segments 14 and the closure member 6 are provided with the transverse predeterminately connecting apertures 10, 30 and 40, respectively, for functional reasons hereinafter explained.

It will be appreciated that in connection with this construction, the closure member has been provided with an add number of transverse apertures as at 20, but the size and the number of said apertures will of course depend upon the size of the valve and the diameter of the stem neck 13. The pins 21 thus engage identical transverse holes 18 in the segments 14, the latter segments, as indicated, surrounding the neck 13 of the stem. Referring now to FIG. 2, the communicating apertures 10, 30, and 40 are selectively aligned by rotating the closure member 6 to provide for the apertures 30 and 40 in turn to coincide or align with the transverse aperture 10 of the stem. With such alignment of these apertures, it will now be apparent that the pins 21 can easily be driven out by a small rod fitting within the apertures 10, 30 and 40, successively, thereby permitting the disc stem connection to be easily dismantled. It will, of course, be appreciated that before such removal of each of the pins is undertaken, the split spring ring 22 is removed. Normally, as indicated in FIG. 2, the said spring ring encircling the groove 22 prevents the pins 21 from being axially moved and therefore are positively held in place.

Referring to FIG. 1, sufficient clearance is provided between the height of the segments 14 and the length of the stem groove provided by the neck 13 to allow for the transmittal of the closing force directly from the valve stem button-head 9 to the surface 11 in the final closing movement of the valve.

In opening the valve, the force required to lift the closure member from the seat 8 is transmitted from the valve stem to the lower shoulder of each of the segments 14 and from the transverse pins 21 to the closure member 6. It will, of course, be understood that the drilling of the holes in the closure member and in the segmental rings can be done simultaneously and accurately in a single set-up of the assembly before an integral ring is split in two. Conversely, two or more segments identical in number with the number of pins 21 required and placed around the neck portion of the stem can be used.

In all other respects, the valve is similar to a conventional one in that a bonnet 25 is fitted with the usual stuffing box 26, the stem being threaded as at 27 for engagement with a yoke bushing 28 mounted in the yoke hub 29. The stem is provided at its upper limit with the usual handwheel 31 and a retaining wheel-nut 32. A gland 33 retains the packing 34 in compressed condition around the valve stem 7.

The novel construction forming the connection between the valve closure member and the stem provides a secure attachment means, while at the same time, eliminating previous objectionable threads, ball races, and lock welds of prior constructions.

It should be further apparent that while only a single embodiment has been illustrated, this is done merely to illustrate one application of my invention and without limiting its scope as measured by the terms of the appended claims.

I claim:
1. In a valve construction having means for retaining a swivelable reciprocably movable closure member to a valve stem;
   the combination of a closure member with an annular transversely apertured walled portion forming a recess and a button-head stem normally received in said recess;
   the stem button-head having a transverse groove defining a stem neck portion;
   a plurality of ring segments fitted around said stem neck portion;
   a plurality of radially extending pins mounted in the apertures of said annular wall portion of the closure and engaging apertured portions of said ring segments within the stem neck portion; and
   means to retain said pins in engaged position.

2. The subject matter of claim 1;
   means for removing said radially extending pins;
   the said means including predeterminately communicating transverse apertures radially extending respectively through said stem, said ring segments and said walled portion of the closure member for enabling entry of a rod or tool to displace said radially extending pins from engagement with the stem neck portion and ring segments through said communicating transverse apertures.

3. The subject matter of claim 2, means for retaining said radially extending pins in engaged position, the said retaining means including a ring-like member engaging said closure member.

4. The subject matter of claim 1, said pin retaining means comprising a body surface portion cooperating with said closure member in the course of reciprocating movement of the latter member.

References Cited by the Examiner
UNITED STATES PATENTS

| 1,181,716 | 5/16 | Allgeyer | 251—75 X |
| 1,646,691 | 10/27 | Gilchrist | 137—420 |
| 2,066,315 | 1/37 | Bauer et al. | 137—421 X |
| 2,133,355 | 10/38 | Lubow | 137—418 |

WILLIAM F. O'DEA, *Primary Examiner.*